US009563380B2

(12) United States Patent
Basham et al.

(10) Patent No.: US 9,563,380 B2
(45) Date of Patent: *Feb. 7, 2017

(54) ZONING OF DEVICES IN A STORAGE AREA NETWORK WITH LUN MASKING/MAPPING

(71) Applicant: International Business Machines Corporation, Armonk, NY (US)

(72) Inventors: Robert B. Basham, Aloha, OR (US); Deanna L. Q. Brown, Queen Creek, AZ (US); Kelly L. Hicks, Tucson, AZ (US); Andrew G. Hourselt, Tucson, AZ (US); Rezaul S. M. Islam, Tucson, AZ (US); Ashaki A. Ricketts, Tucson, AZ (US); Teresa S. Swingler, Tucson, AZ (US); Theodore B. Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/581,034

(22) Filed: Dec. 23, 2014

(65) Prior Publication Data
US 2015/0113183 A1    Apr. 23, 2015

Related U.S. Application Data

(63) Continuation of application No. 12/039,496, filed on Feb. 28, 2008, now Pat. No. 8,930,537.

(51) Int. Cl.
*G06F 13/12*    (2006.01)
*G06F 3/06*    (2006.01)
(Continued)

(52) U.S. Cl.
CPC .......... *G06F 3/0629* (2013.01); *G06F 3/0604* (2013.01); *G06F 3/0605* (2013.01); *G06F 3/067* (2013.01);
(Continued)

(58) Field of Classification Search
None
See application file for complete search history.

(56) References Cited

U.S. PATENT DOCUMENTS 6,636,237 B1   10/2003   Murray et al.
6,681,282 B1   1/2004    Golden et al.
(Continued)

OTHER PUBLICATIONS

U.S. Appl. No. 12/039,496.
(Continued)

*Primary Examiner* — Henry Tsai
*Assistant Examiner* — Aurangzeb Hassan
(74) *Attorney, Agent, or Firm* — Stephen R. Tkacs; Stephen J. Walder, Jr.; Randall J. Bluestone (57) ABSTRACT

Host port information is pulled directly from the switch before zoning is performed and is organized by chassis as an assist for mapping and masking an entire chassis. A graphical user interface allows a user to select storage by chassis to map and to select servers by chassis to map. The user then applies that mapping such that all servers selected are mapped to all storage selected. The user may repeat this mapping for another set of storage and servers. In a mixed environment, an icon may be shown in the graphical user interface to represent the mix. When the LUN mapping/masking is done, the LUN mapping/masking may be provided to the SAN manager to perform zoning. The LUN mapping/masking defines which host ports see which storage ports.

18 Claims, 6 Drawing Sheets

(51) Int. Cl.
  *H04L 29/08* (2006.01)
  *H04L 12/24* (2006.01)

(52) U.S. Cl.
  CPC ........... *G06F 3/0622* (2013.01); *G06F 3/0637*
    (2013.01); *G06F 3/0683* (2013.01); *H04L*
    *41/22* (2013.01); *H04L 67/1097* (2013.01);
    *G06F 3/0607* (2013.01); *G06F 3/0689*
    (2013.01); *H04L 41/08* (2013.01); *H04L*
    *41/0893* (2013.01)

(56) References Cited

U.S. PATENT DOCUMENTS

| | | | |
|---|---|---|---|
| 6,839,747 B1 | 1/2005 | Blumenau et al. | |
| 7,039,870 B2 | 5/2006 | Takaoka et al. | |
| 7,103,647 B2 | 9/2006 | Aziz | |
| 7,103,653 B2 | 9/2006 | Iwatani | |
| 7,107,534 B1 | 9/2006 | de Jong et al. | |
| 7,167,472 B2 | 1/2007 | Wu et al. | |
| 7,437,462 B2 * | 10/2008 | Marks | G06F 3/0605 709/224 |
| 7,437,676 B1 | 10/2008 | Magdum et al. | |
| 7,478,107 B1 | 1/2009 | Yehuda | |
| 7,533,169 B1 * | 5/2009 | Gold | H04L 41/12 709/223 |
| 7,680,905 B1 | 3/2010 | Roberts et al. | |
| 7,681,130 B1 | 3/2010 | Lavallee et al. | |
| 7,702,782 B1 | 4/2010 | Pai | |
| 7,730,171 B2 | 6/2010 | Frazier et al. | |
| 7,827,476 B1 | 11/2010 | Roberts et al. | |
| 7,881,946 B1 | 2/2011 | Yehuda et al. | |
| 2002/0103889 A1 | 8/2002 | Markson et al. | |
| 2003/0149763 A1 | 8/2003 | Heitman et al. | |
| 2003/0233427 A1 | 12/2003 | Taguchi | |
| 2004/0078599 A1 | 4/2004 | Nahum | |
| 2004/0085347 A1 | 5/2004 | Hagarty, Jr. et al. | |
| 2004/0257998 A1 | 12/2004 | Chu et al. | |
| 2004/0264398 A1 | 12/2004 | Chu et al. | |
| 2005/0021732 A1 | 1/2005 | Suffern et al. | |
| 2005/0036499 A1 | 2/2005 | Dutt et al. | |
| 2005/0091353 A1 | 4/2005 | Gopisetty et al. | |
| 2005/0108375 A1 | 5/2005 | Hallak-Stamler | |
| 2005/0154989 A1 | 7/2005 | Maddocks et al. | |
| 2005/0240727 A1 | 10/2005 | Shah et al. | |
| 2007/0033366 A1 | 2/2007 | Eisenhauer et al. | |
| 2007/0266110 A1 | 11/2007 | Chawla et al. | |

OTHER PUBLICATIONS

Basham, Robert et al., "System and Method for Zoning of Devices in a Storage Area Network", U.S. Appl. No. 11/859,867, filed Sep. 24, 2007.

* cited by examiner

ZONING OF DEVICES IN A STORAGE AREA NETWORK WITH LUN MASKING/MAPPING

BACKGROUND OF THE INVENTION

1. Field of the Invention

The present application relates generally to an improved data processing system and method. More specifically, the present application is directed to a system and method for zoning of devices, such as serial attached SCSI (SAS) devices, for example, in a storage area network (SAN) based on logical unit number (LUN) masking/mapping.

2. Background of the Invention

Storage area networks, or SANs, consist of multiple storage devices connected by one or more fabrics. Storage devices can be of two types: host systems that access data, and storage subsystems that are providers of data. Zoning is a network-layer access control mechanism that dictates which storage subsystems are visible to which host systems. This access control mechanism is useful in scenarios where the storage area network is shared across multiple administrative or functional domains. Such scenarios are common in large installations of storage area networks, such as those found in storage service providers.

The current approach to zoning storage area networks is typically manual and involves correlating information from multiple sources to achieve the desired results. For example, if a system administrator wants to put multiple storage devices in one zone, the system administrator has to identify all the ports belonging to the storage devices, verify the fabric connectivity of these storage devices to determine the intermediate switch ports and input all this assembled information into the zone configuration utility provided by the fabric manufacturer. This manual process is very error-prone because storage device or switch ports are identified by a 48-byte hexadecimal notation that is not easy to remember or manipulate. Furthermore, the system administrator has to also do a manual translation of any zoning policy to determine the number of zones as well as the assignment of storage devices to zones.

Recently a new approach to zoning of Fibre Channel architecture based storage area networks has been devised in which automatic zoning of storage area networks (SANs) is performed based on system administrator defined policies. This mechanism is described in commonly assigned U.S. Patent Application Publication No. 2005/0091353 entitled "System and Method for Autonomically Zoning Storage Area Networks Based on Policy Requirements." With this mechanism, in a measurement phase of operation, configuration data and connectivity topology data is periodically collected from each of the devices in the SAN using software agents which are placed in every switch and host device in the SAN. The collected data is analyzed to determine relationships between the devices in the SAN. The information obtained from such an analysis is converted into a graph structure where each node is either a switch port or a storage device port. A zone plan is then generated based on the graph structure and system administrator established zoning policies. The generated zone plan is then provided to a system administrator for approval and, if approved, the zone plan is implemented in the SAN by programming the zoning plan onto individual switches included within the SAN.

One emerging technology that is being used more prevalently with storage area networks is Serial Attached SCSI (SAS) communication protocol technology. SAS is a computer bus technology primarily designed for transfer of data to and from devices such as hard drives, CD-ROM drives, tape storage devices, and the like. Traditionally, SAS is a serial communication protocol for direct attached storage (DAS) devices. Recently, however, the protocol has been extended to include storage area network support. It is designed for the corporate and enterprise market as a replacement for parallel SCSI, allowing for much higher speed data transfers than previously available, and is backwards-compatible with SATA drives. Though SAS uses serial communication instead of the parallel method found in traditional SCSI devices, it still uses SCSI commands for interacting with SAS end devices.

SAS zoning in a storage area network is particularly difficult. Typically, the SAS zoning is a two step mapping where each individual port, or "phy," is assigned to a zone group and then, as a subsequent step, each zone group is mapped to each of the host systems. SAS zoning is increasingly being targeted at users or customers that do not necessarily have storage area network knowledge or skills and thus, do not have the necessary background to perform the manual zoning of SAS based storage area networks. Thus, these users or customers require tools to help make the zoning of the storage area network easier.

However, SAS poses some unique zoning challenges that are not present in more conventional Fibre Channel architecture based SANs. For example, in Fibre Channel, defining a zone configuration is simply a matter of grouping ports into a "zone" such that all ports in the "zone" can see each other. SAS zoning, on the other hand, is a two-step process. It requires the user to group ports into a zone group but then a separate step is required for access. Another complexity is the limit on the number of zone groups that can be defined. The current limit is 128 but is moving up to 256. This means that certain techniques like assigning each initiator port to its own zone (a technique common in Fibre Channel zoning) will not work in larger SAS SANs. Another example of complexity is the manner in which SAS zoning boundaries (ZSPDS) are defined. For SAS, access to devices beyond the SAS domain zoning boundary is defined and allowed. Thus, it is a complex task to understand and comply with the rules for access in SAS SANs. For Fibre Channel, the zone graph ends at the zoning boundary, i.e. there is absolutely no access beyond that boundary.

Another emerging aspect of SAS that makes it more complex is that it resides inside and outside the server or blade system chassis. The SAS topology is not simply a graph of external nodes as in Fibre Channel. It is more hierarchical, with a mixture of internal and external nodes. Thus, any SAS zoning mechanism will have to accommodate the different rules for the portions of the SAS SAN within the server or blade system chassis and the portions that are external to the server or blade system chassis. Thus, Fibre Channel zoning mechanisms typically make use of a single, monolithic graph for managing the Fibre Channel based SAN. Such an approach cannot be applied to SAS SANs due to the various complexities mentioned above.

SAS zoning manages the physical connections hosts make to storage. Access management is controlled through logical unit number (LUN) mapping and masking. A logical unit number is an address for an individual logical disk drive. The term LUN is used in the SCSI protocol as a way to differentiate individual logical disk drives within a common SCSI target device like a disk array. The term has become common in storage area networks (SAN). Today, LUNs are normally not entire disk drives but rather virtual volumes. Thus, a particular storage subsystem may have hundreds, or perhaps more, LUNs. Thus, storage may have several levels of granularity from the chassis level to the blade level to the storage subsystem level to the disk drive level to the logical volume level.

Logical unit number masking is an authorization process that makes a LUN available to some hosts and unavailable to other hosts. LUN masking is mainly implemented not as a security measure per se, but rather as protection against misbehaving servers from corrupting disks belonging to other servers. For example, Windows® servers attached to a SAN may under some conditions corrupt non-Windows® volumes on the SAN by attempting to write Windows® volume labels to them. By hiding the other LUNs from the Windows® server, this can be prevented, since the Windows® server does not even realize the other LUNs exist. "WINDOWS" is a trademark of Microsoft Corporation in the United States, other countries, or both.

Thus, an administrator may configure a SAN with two distinct steps: zoning for the physical connections between hosts and storage and LUN masking/mapping for access control at the storage manager.

BRIEF SUMMARY OF THE INVENTION

In one illustrative embodiment, a method zones a storage area network with logical unit number masking/mapping. The method comprises providing a graphical user interface for performing logical unit number masking/mapping such that a user maps one or more servers to one or more logical volumes to form a logical unit number mapping. The method further comprises applying the logical unit number mapping in a storage manager. The method comprises automatically zoning the storage area network based on the logical unit number mapping in a storage area network manager.

In another illustrative embodiment, a data processing system zones a storage area network with logical unit number masking/mapping. The data processing system comprises a processor and a memory coupled to the processor. The memory comprises instructions which, when executed by the processor, cause the processor to provide a graphical user interface for performing logical unit number masking/mapping such that a user maps one or more servers to one or more logical volumes to form a logical unit number mapping. The instructions further cause the processor to apply the logical unit number mapping in a storage manager. The instructions further cause the processor to automatically zone the storage area network based on the logical unit number mapping in a storage area network manager.

In another illustrative embodiment, a computer program product comprises a computer useable medium having a computer readable program. The computer readable program, when executed on a computing device, causes the computing device to provide a graphical user interface for performing logical unit number masking/mapping such that a user maps one or more servers to one or more logical volumes to form a logical unit number mapping. The computer readable program further causes the computing device to apply the logical unit number mapping in a storage manager. The computer readable program further causes the computing device to automatically zone the storage area network based on the logical unit number mapping in a storage area network manager.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a system and method for automatically performing zoning of devices in a storage area network (SAN) with logical unit number masking/mapping. For example, the zoning performed by the illustrative embodiments may be performed with regard to Serial Attached SCSI (SAS) devices within the SAN such that zone permission tables and other data structures of SAS expanders are configured based on this zoning. In order to provide a context for understanding the arrangement and operation of the illustrative embodiments, FIG. 1 is provided hereafter as one example of a SAN in which the mechanisms of the illustrative embodiments may be implemented.

It should be appreciated that while the illustrative embodiments will be described with regard to zoning of SAS devices using SAS expanders, the present invention is not limited to such. To the contrary, the mechanisms of the illustrative embodiments may be utilized with any SAN architecture and SAN devices in which zoning is utilized to control communication connection establishment and management between SAN devices. Since SAS is being utilized in the description of the illustrative embodiments, it is assumed that those of ordinary skill in the art are familiar with the SAS-2 standard promulgated by the Technical Committee T10.

Figure 1:
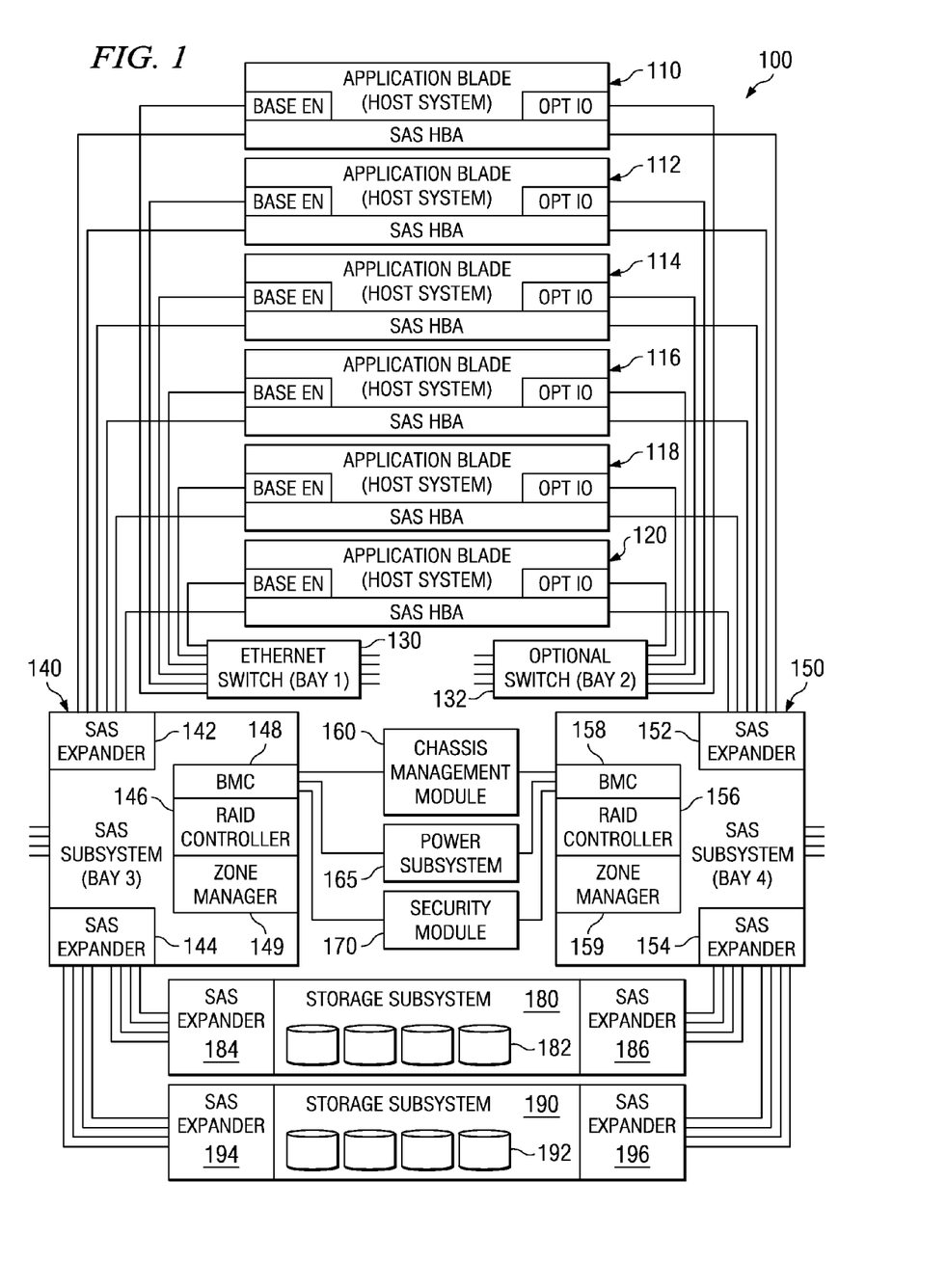
FIG. 1 is an exemplary diagram illustrating a tiered representation of a storage area network (SAN) in accordance with one illustrative embodiment.

With reference now to the figures, FIG. 1 is an exemplary diagram illustrating a storage area network (SAN) in accordance with one illustrative embodiment. As shown in FIG. 1, the SAN may be provided in a chassis 100, such as a BladeCenter™ chassis available from International Business Machines Corporation of Armonk, N.Y. Within the chassis 100, a plurality of host servers or host systems may be provided on application blades 110-120. Each host servers 110-120 may have one or more input/output adapters including a base Ethernet (base EN) adapter for communication with an Ethernet switch 130, an optional I/O (opt I/O) adapter for communication with an optional switch 132, and SAS host bus adapter (SAS HBA) for communication with SAS subsystems 140 and 150. In addition to these elements, a chassis management module 160, power subsystem 165, and security module 170 may be provided within the chassis 100 for performing various management, power, and security functions. The elements of the chassis 100 communicate with one another via a SAN fabric.

The SAN fabric may include connections, such as wired links, wireless communication links, fiber optic cables, or the like. The SAN fabric may utilize one or more communication protocols including, for example, Fibre Channel, Ethernet, or the like. In the depicted example, the SAN fabric uses SAS to communicate between the application blades 110-120 and the storage subsystems 180 and 190 via the SAS subsystems 140 and 150.

The SAS subsystems 140 and 150 operate as switches in the SAN fabric and controllers for accessing the storage subsystems 180 and 190. As shown in FIG. 1, the storage subsystems 180 and 190 are comprised of a plurality of storage devices 182 and 192, respectively, which are accessed via one or more SAS expanders 184, 186, 194, and 196. The storage devices 182 and 192 may comprise a single disk drive, tape drive, optical drive, or a plurality of such storage devices, such as in a disk array. For example, the storage device 182 may comprise a disk array, such as a Redundant Array of independent Disks (RAID) system with the disk devices in the RAID system being Just a Bunch of Disks (JBOD) devices and/or Switched Bunch of Disks (SBOD) systems.

The SAS subsystems 140 and 150 may themselves comprise a host side SAS expander 142, 152, and a storage subsystem side SAS expander 144, 154. The SAS expanders 142, 144, 152, 154, 184, 186, 194, and 196 may be configured to support zoning in accordance with the illustrative embodiments. The SAS expanders 142, 144, 152, 154, 184, 186, 194, and 196 may be provided in one or more zoned portions of a service delivery subsystem (ZPSDS). The SAS expanders 142, 144, 152, 154, 184, 186, 194, and 196 control whether a port, or phy, of a storage subsystem 180 or 190, or host system 110-120, is permitted to participate in a connection with another port, or phy, of another storage subsystem 180 or 190, or host system 110-120.

Moreover, the SAS subsystems 140 and 150 may further comprise storage subsystem controllers, such as RAID controllers 146 and 156, blade management controllers (BMC) 148 and 158, and at least one zone manager 149 and 159. While a plurality of zone managers 149 and 159 are shown in FIG. 1, it should be appreciated that only one zone manager, e.g., zone manager 149, may be actively managing the zones of the SAN at one time using the mechanisms of the illustrative embodiments, as described hereafter. The RAID controllers 146 and 156 perform various control operations for controlling operation and access to the storage subsystems 180 and 190. The BMCs 148 and 158 perform various management operations for managing the application blades 110-120 of the chassis 100. The BMCs 148 and 158 may communicate with the chassis management module 160 to obtain vital product data (VPD) for the various application blades 110-120 and storage subsystems 180 and 190.

Moreover, the BMCs 148 and 158 may perform discovery operations for discovering the position, i.e. the bay or drawer identifier, of the various application blades 110-120, the SAS subsystems 140 and 150, switches 130 and 132, and storage subsystems 180 and 190. The BMCs 148 and 158 perform discovery of position information within the chassis 100 by using well known chassis communication techniques such that the SAS subs stem 140 and 150 obtains vital product data (VPD) which is filled in by the chassis management module 160. This VPD has information regarding the host servers, whether the host servers are powered on or not, and the like. As a result, the SAS subsystem 140, 150 knows the chassis id of chassis 100 it is in, host servers 110-120 around the SAS subsystem 140, 150, storage devices in storage subsystems 180 and 190 on the chassis 100, and also which bay or drawer the SAS subsystem 140, 150 is in within the chassis 100. The BMC 148, 158 can then pass this information to the zone manager 149.

As shown in FIG. 1, the SAS subsystems 140 and 150, as well as the switches 130 and 132, have external ports for communicating with other devices outside of the chassis 100. These external devices may be part of the SAN as well, but may be provided in other chassis (not shown), coupled to the chassis 100 via art external data network (not shown), or the like. Discovery of the ports, or phys, associated with external data storage devices and host systems is generally covered in the SAS specification, revision 9, available from Technical Committee T10.

At the start of the zoning operation, the zone manager 149 of the SAN generates a list of ports, phys, on the SAN, such as through the above discovery processes. During generation of this list of ports, or plays, the zone manager 149 determines which ports are associated with SAS end devices, i.e. storage devices or host system devices, that provide data storage, i.e. storage devices 182 and 192, which ports/phys are host systems, e.g., host servers on application blades 110-120, whether there are storage system controllers, e.g., RAID controllers 146 and 156, present in association with the end devices, and other hardware details. Therefore, a listing of host system ports and storage system ports/phys are both automatically available at the start of the operation of the mechanisms of the illustrative embodiments.

Additional information is available within the details of each port in each list. For example, the details for each port may identify whether the port is associated with a storage device that is part of an external Switched Bunch of Disks (SBOD) system, an internal Just a Bunch of Disks (JBOD) system, or the like. The zone manager 149 uses the information gathered in these lists through the discovery process to perform various zone management operations for automatically zoning the SAN in accordance with the illustrative embodiments as described hereafter.

Figure 2:
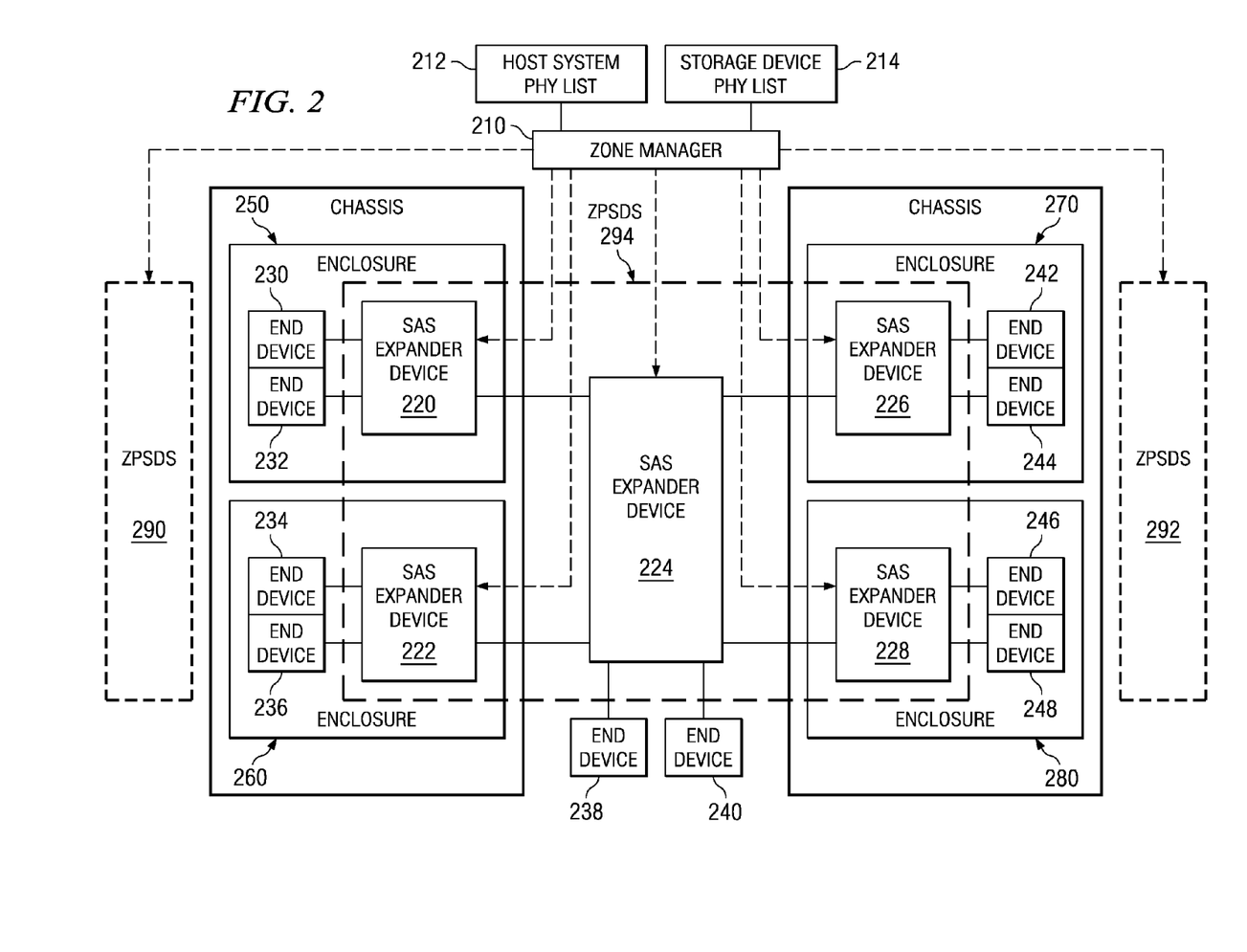
FIG. 2 is an exemplary diagram illustrating a SAN in which a zone manager and serial attached SCSI (SAS) expanders are utilized in accordance with one illustrative embodiment.

FIG. 2 is an exemplary diagram illustrating a SAN in which a zone manager and SAS expanders are utilized in accordance with one illustrative embodiment. There are a number of possible configurations for a SAS based SAN with the depicted implementation being only one example. In the depicted example, the zone manager communicates directly with the SAS expander devices, however this is not a requirement. For example, the zone manager may be coupled to an end device through which the zone manager may communicate with the SAS expanders. Furthermore, the zone manager may communicate to each of the SAS expanders through another SAS expander and an end device.

Thus, the zone manager may have access to an end device with a SAS port, or phy, whose zone group has access to zone group 2, as discussed hereafter, or may have access to one or more SAS expander devices through a sideband interface, e.g., Ethernet or the like. Other configurations may be used with the mechanisms of the illustrative embodiments without departing from the spirit and scope of the present invention.

As shown in FIG. 2, the zone manager 210, which may be provided in a SAS subsystem of one of the chassis or a different chassis than those shown in FIG. 2, communicates with a plurality of SAS expander devices 220-228 which are in turn coupled to SAS end devices 230-248 and received host system phy lists 212, 214. The SAS end devices 230-248 may be provided in enclosures 250-280 of storage systems, such as storage systems 112-118 in FIG. 1, for example. The storage systems 112-118 may, or may not, have associated storage system controllers, such as RAID controllers or the like, provided in associated SAS subsystems, that control the transfer of data to/from the end devices 230-248 via the SAS expander devices 220-228. The SAS expander devices 220-228 may be part of a zoned portion of a service delivery subsystem (ZPSDS) 294. The SAN structure may comprise a plurality of such ZPSDS 294, 290, and 292, having the same or different configurations of SAS expanders. Moreover, there may be multiple zone managers 210, such as one for each ZPSDS 294, 290, and 292.

The zone manager 210 assigns zone groups to all the ports, or phys, that are capable of participating in connections through the ZPSDS 294. Every phy in a SAS domain may be assigned to a zone group. In the current SAS-2 specification, there is support for 128 zone groups numbered 0 through 127, although the present invention is not limited to 128 zone groups in order to operate properly. Zone group numbers are assigned to SAS expander device 220-228 phys as part of the zone pity information and are assigned to SAS addresses in the SAS expander routing table data structures, described hereafter.

Each phy of a SAS expander device 220-228 supports the following zone phy information: an "inside ZPSDS" bit, a "requested inside ZPSDS" bit, an "inside ZPSDS persistent" bit, a "zone group persistent" bit, and a "zone group" field. The "inside ZPSDS" bit indicates if the phy is inside or on the boundary of a ZPSDS 294. An "inside ZPSDS" bit set to zero indicates that the phy is attached to an end device, a SAS expander device that does not support zoning, or a SAS expander device with zoning disabled. An "inside ZPSDS" bit set to one indicates that the phy is attached to a SAS expander device with zoning enabled and is thus, inside a ZPSDS 294. The "inside ZPSDS" bit is not directly changeable and only changes following a link reset sequence based on the "requested inside ZPSDS" bit, which is used to establish the boundary of the ZPSDS 294.

The "requested inside ZPSDS" bit is transmitted in an IDENTIFY address frame to the attached phy and is used to determine the values of other zone phy information fields after a link reset sequence. The "inside ZPSDS persistent" bit indicates the method used to determine the value of the "inside ZPSDS" hit after a link reset sequence and is transmitted in the IDENTIFY address frame. The "zone group" field contains a value in the range of 0 to 127 that specifies the zone group to which the phy belongs. More information about this zone phy information and the use of this information in a SAS based system may be found in the SAS-2 specification.

In accordance with the SAS-2 specification, a SAS expander device 220-228 phy inside a ZPSDS 294 is assigned to zone group 1. A phy attached to the boundary of the ZPSDS 294, i.e. attached to an SAS expander phy with an "inside ZPSDS" bit set to zero, belongs to the zone group indicated by the zone group field of the SAS expander pity to which it is attached. A phy attached to one or more SAS expander devices beyond the boundary of the ZPSDS 294 belongs to the zone group of the boundary PHY for purposes of routing and access within the zone group. The zone groups assigned in one ZPSDS 294 have no relationships to zone groups assigned in another ZPSDS 290, 292.

Each SAS expander device 220-228 contains a zone permission table data structure that controls whether a connection is allowed between phys based on their zone groups. A requested connection is only established if the zone permission table indicates that access between the zone group of the source port, or phy, and the zone group of the target port, phy, is allowed.

Figure 3:
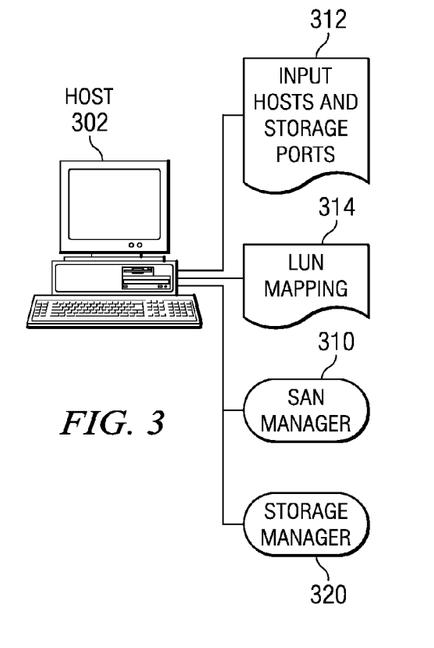
FIG. 3 illustrates a system for zoning of devices in a storage area network with logical unit number masking/mapping in accordance with an illustrative embodiment.

FIG. 3 illustrates a system for zoning of devices in a storage area network with logical unit number masking/mapping in accordance with an illustrative embodiment. Typically, a user, such as an administrator, does end-to-end storage configuration in two steps. First, the user zones the SAN. The storage device graphical user interface (GUI) may then see the host ports and import them for LUN masking/mapping, which is an authorization process that makes a LUN available to some hosts and unavailable to other hosts. LUN masking/mapping is mainly implemented not as a security measure per se, but rather as protection against misbehaving servers from corrupting disks belonging to other servers. Without importing host ports, LUN masking/mapping becomes a very tedious and error-prone exercise in manual entry of very long world wide name strings, which may be 32 hexadecimal characters. Tools may be developed to allow the user to perform LUN masking/mapping based on the zoning.

However, even given tools to import hosts for LUN masking/mapping, the SAN configuration is still a two step process. In accordance with one illustrative embodiment, as shown in FIG. 3, a user may perform LUN masking/mapping and the SAN manager may zone the SAN automatically based on the LUN masking/mapping. SAN manager 310 may collect information about the host ports and storage ports in the SAN. Storage manager 320 provides LUN information for the logical volumes available to storage manager 320. A user at host 302 may then perform LUN masking/mapping through a graphical user interface (GUI), which may be provided by storage manager 320 as a Web based interface, for example. Host 302 may access the GUI through an out-of-band network, such as Ethernet, for instance. The GUI provides input hosts and storage ports 312 received from SAN manager 310 and storage manager 320. The user then maps hosts to the LUNs they are permitted to access to form LUN mapping information 314.

LUN mapping information 314 is provided to storage manager 320. In addition, host 302 may provide LUN mapping information 314 to SAN manager 310. Given LUN mapping information 314, SAN manager 310 may automatically zone the SAN based on which hosts are intended to see which storage.

The GUI provided at host 302 may simplify the LUN masking/mapping process based on the input hosts and storage ports information 312 received from SAN manager 310. While some users may wish to perform LUN masking/mapping on a very detailed level, many users configure the SAN very logically. For example, some users place all the application servers in certain chassis and all the storage subsystems in other chassis. As another example, some users place the storage subsystem blades in the same chassis as the application servers that will access the storage subsystem blades. Therefore, the GUI presented to the user at host 302 allows the user to perform LUN masking/mapping at a more logical level. The user may map servers to storage at various levels of granularity. The GUI may also present the servers and storage in table form or, alternatively, as a topological diagram of the SAN where the user can select a chassis or blade for mapping, depending on the level of granularity desired.

In an alternative embodiment, SAN manager 310 may collect information about the host ports and storage ports in the SAN. Storage manager 320 may then pull the host port and storage port information from SAN manager 310. A user at host 302 may then perform LUN masking/mapping through a graphical user interface (GUI). The GUI provides input hosts and storage ports 312 received from storage manager 320, which pulled the input hosts and storage ports information 312 from SAN manager 310. The user then maps hosts to the LUNs they are permitted to access to form LUN mapping information 314. LUN mapping information 314 is provided to storage manager 320. In addition, storage manager 320 may push LUN mapping information 314 to SAN manager 310. Given LUN mapping information 314, SAN manager 310 may automatically zone the SAN based on which hosts are intended to see which storage.

Simplifying the LUN mapping and masking implies that the user does not have to decide individually which servers are mapped to storage, how many LUNs that a server gets, and how big they are. In a template approach, the GUI may keep choices limited and fixed. An example may be to divide a percentage of storage evenly among all servers or to give each server a fixed amount of storage. Another example may be to give each chassis a fixed amount of storage and divide it evenly among the chassis server blades. There are larger constructs, such as a rack, that may be used as the template. An entity like a rack manager (IBM Director, for example, has a rack manager) may define a rack template that may be used to configure the LUN mapping for an entire rack. Thus, constructs larger than a chassis that allow for a template are contemplated. The advantage of a fixed template approach is simplicity.

Alternatively, in a policy approach, a policy engine may use LUN mapping policies. Policies may include, for example, chassis or server blades of a certain type get a certain amount of storage. In another example, a policy may include, storage quality of service parameters are added to ensure that the proper RAID type, drive type, and controller type are chosen for a particular host type. Host typing may be done on physical positioning, logical naming, or tagging qualifiers.

Figure 4A:
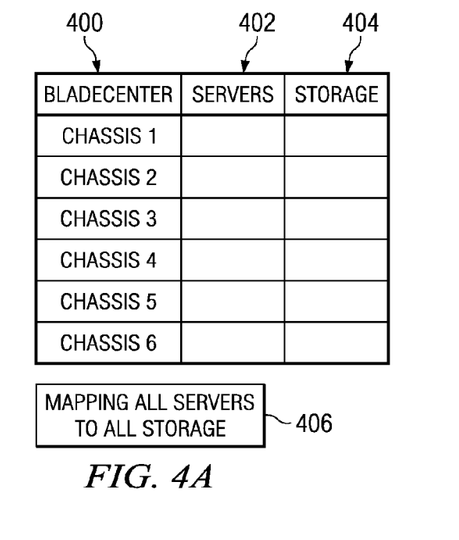
FIGS. 4A-4C illustrate a table form of graphical user interface for logical unit number masking/mapping in accordance with an illustrative embodiment.
Figure 4B:
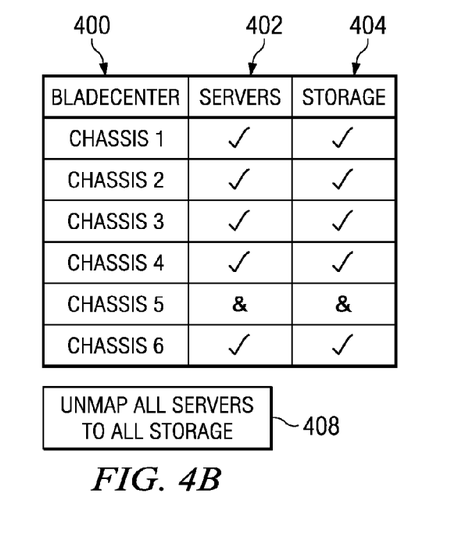
Figure 4C:
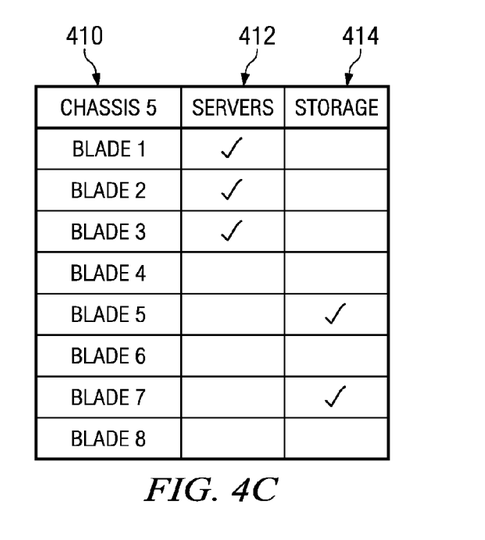

FIGS. 4A-4C illustrate a table form of a graphical user interface for logical unit number masking/mapping in accordance with an illustrative embodiment. In the depicted example, the GUI leverages the BladeCenter™ chassis to allow some granularity in LUN masking/mapping while not requiring mapping of each individual server and storage unit. More particularly, with reference to FIG. 4A, GUI 400 comprises a table where the rows represent chassis 1 to chassis 6. Column 402 represents servers and column 404 represents storage. A user may select control 406 to map all servers in all chassis to all storage in all chassis.

Turning to FIG. 4B, GUI 400 illustrates that a user has selected to map all servers to all storage in chassis 1-4 and 6. Chassis 5 has a mixed mapping, meaning not all servers are mapped to all storage. In FIG. 4B, GUI 400 presents a graphical indicator for a mixed mapping, which may be selected to expand on the mixed mapping. In this way, the user may perform the LUN masking/mapping at a lower level of granularity, such as the blade level.

With reference now to FIG. 4C, GUI 410 illustrates a table form that represents a mapping at the blade level. GUI 410 may be presented as a result of selecting the mixed mapping graphical indicator for chassis 5 in FIG. 4B, for example. The rows represent blades 1-8. Column 412 represents servers, and column 414 represents storage. In the depicted example, servers in blades 1-3 are permitted to access storage in blades 5 and 7. Although not shown, the user may perform LUN masking/mapping at even lower levels of granularity, such as for individual logical volumes, for example.

Figure 5:
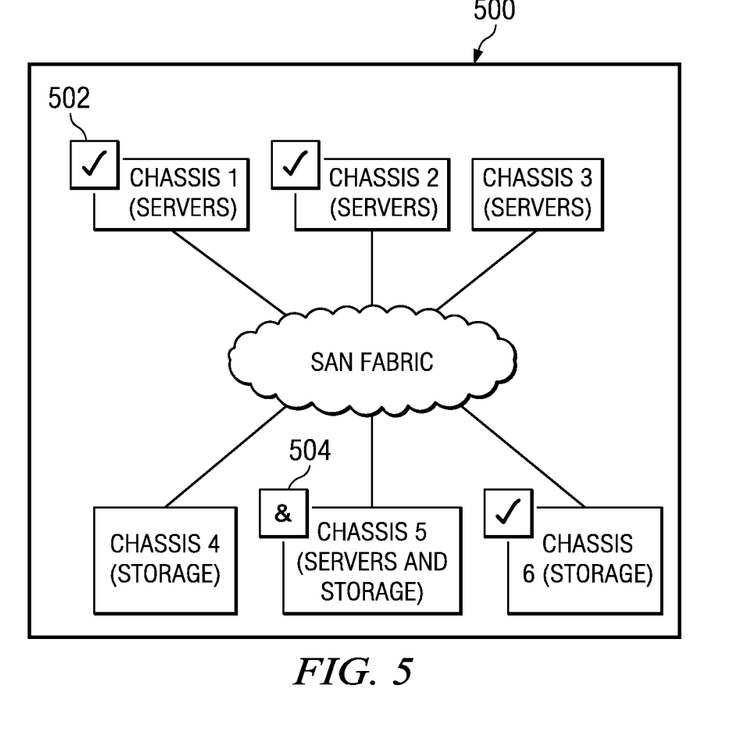
FIG. 5 illustrates a graphical user interface for performing logical unit number masking/mapping at a chassis level using a topographical view in accordance with an illustrative embodiment.

FIG. 5 illustrates a graphical user interface for performing logical unit number masking/mapping at a chassis level using a topographical view in accordance with an illustrative embodiment. GUI 500 presents the storage area network in a topographical view at the chassis level. Chassis 1-3 comprise servers, chassis 4 and 6 comprise storage, and chassis 5 comprises a combination of servers and storage. In the depicted example, servers in chassis 1, 2, and 5 are allowed to access storage in chassis 5 and 6. Graphical indicator 502 indicates that all servers in chassis 1 are mapped. Graphical indicator 504 indicates that chassis 5 is a mixed mapping.

Figure 6:
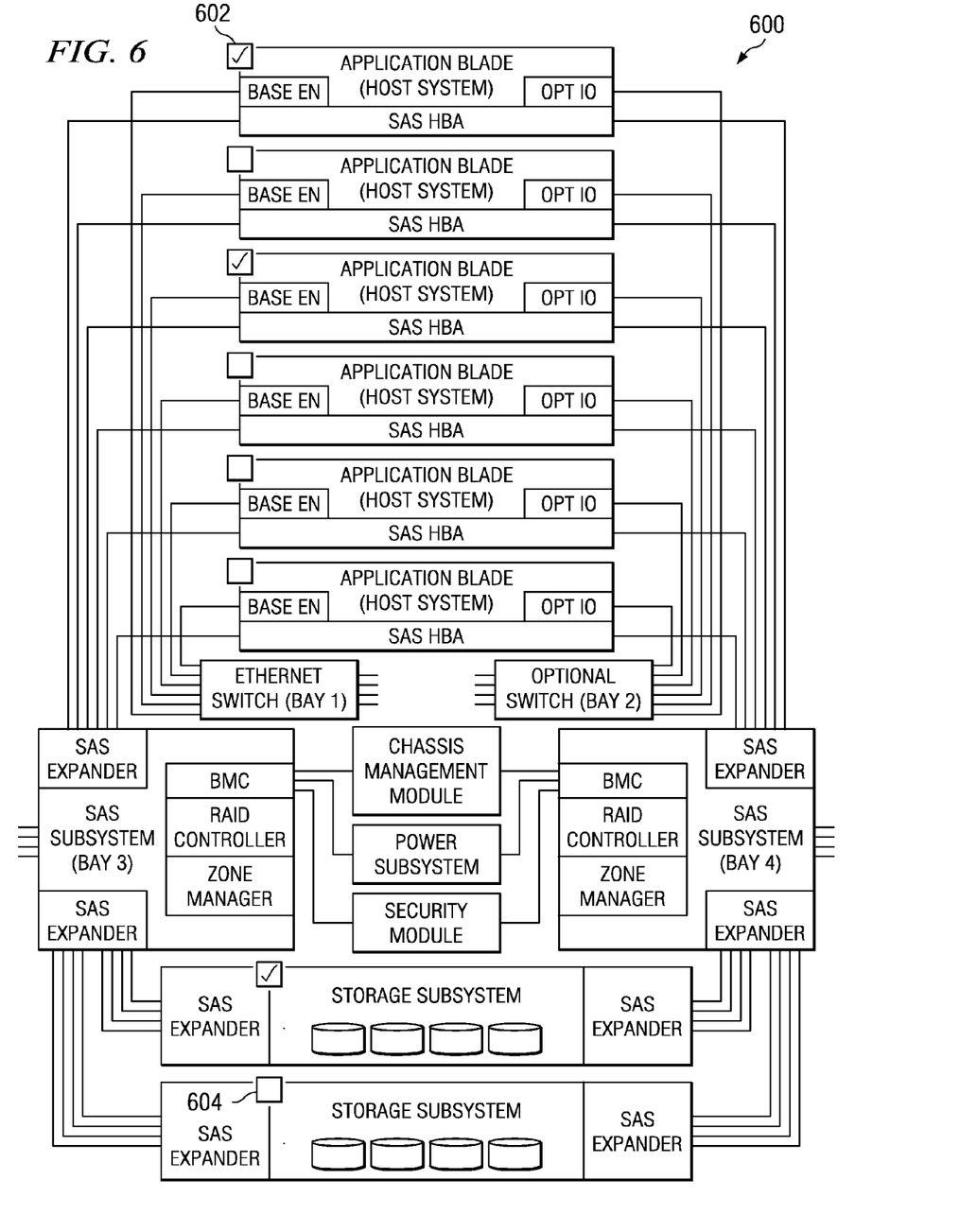
FIG. 6 illustrates a graphical user interface for performing logical unit number masking/mapping at a blade level using a topographical view in accordance with an illustrative embodiment.

FIG. 6 illustrates a graphical user interface for performing logical unit number masking/mapping at a blade level using a topographical view in accordance with an illustrative embodiment. GUI 600 presents a chassis in a topographical view at the blade level. GUI 600 may be presented as a result of selecting mixed mapping graphical indicator 504 in FIG. 5, for example. In the depicted example, graphical indicator 602 is selected and graphical indicator 604 is unchecked. Thus, the first and third application server blades and the first storage subsystem blade are mapped, while the second, fourth, fifth, and sixth application server blades and the second storage subsystem blade are not mapped.

The graphical user interfaces shown in FIGS. 4A-4C, 5, and 6 are exemplary and are not intended to limit the present invention. A person of ordinary skill in the an will recognize that other user interface techniques and controls may be used without departing from the spirit and scope of the present invention. In addition, the examples illustrated in FIGS. 4A-4C, 5, and 6 represent a BladeCenter™ system; however, the aspects of the illustrative embodiments may apply to other architectures, and the levels of granularity and configuration of servers and storage may vary depending upon the implementation.

Figures 7, 8:
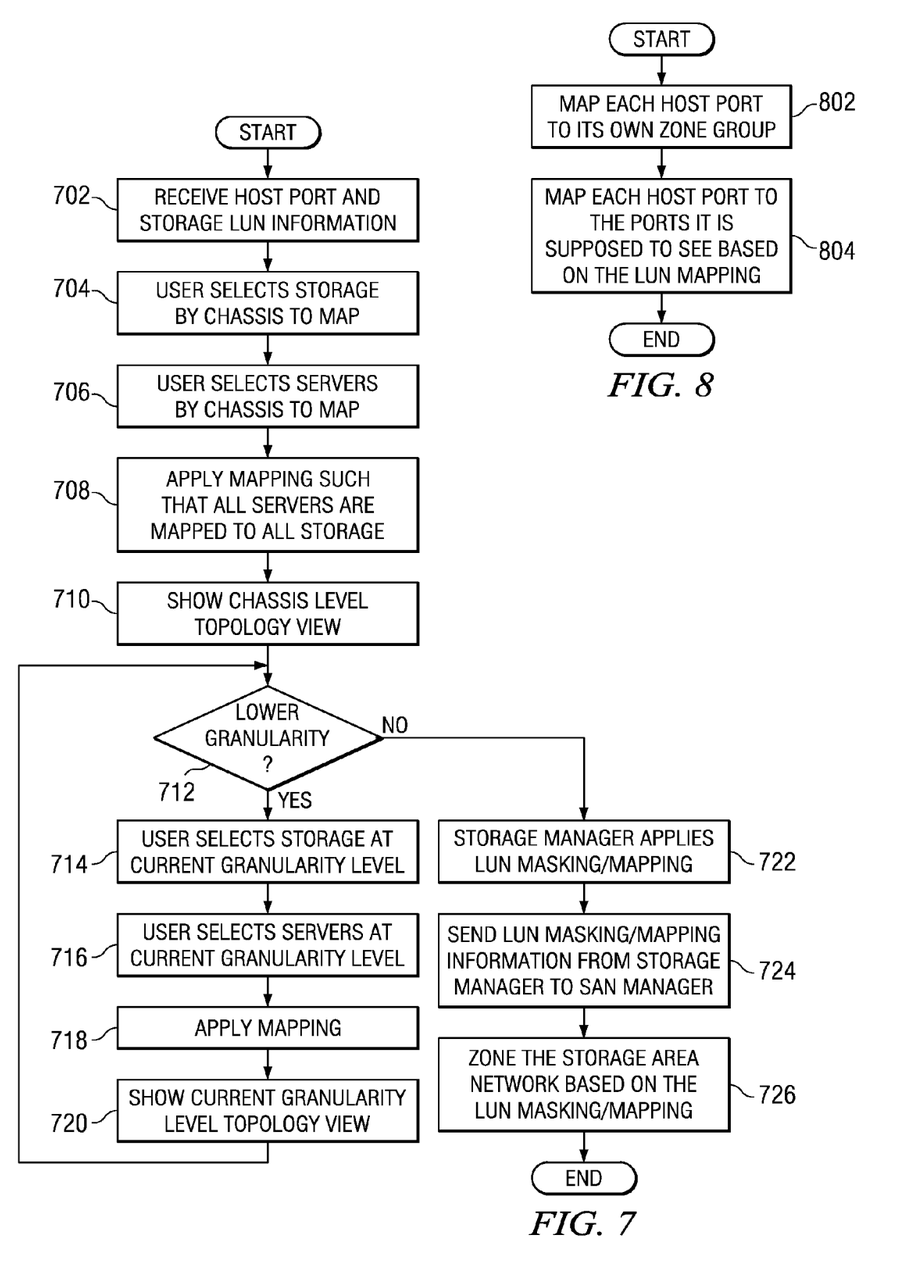
FIG. 7 is a flowchart illustrating operation of a system for zoning of devices in a storage area network with logical unit number masking/mapping in accordance with an illustrative embodiment.
FIG. 8 is a flowchart illustrating operation of zoning devices in a storage area network based on logical unit number masking/mapping in accordance with an illustrative embodiment.

FIG. 7 is a flowchart illustrating operation of a system for zoning of devices in a storage area network with logical unit number masking/mapping in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference to FIG. 7, operation begins and the storage manager receives host port and storage LUN information (block 702). As stated above, the storage manager may pull the host port information from a SAN manager or directly from a switch. Using a graphical user interface (GUI), the user selects storage by chassis to map (block 704). Then, the user selects servers by chassis to map (block 706). The GUI then applies the mapping such that all selected servers are mapped to all selected storage (block 708).

The GUI application shows the chassis level topology view (block 710) and makes a determination as to whether the user wishes to map servers and/or storage at a lower granularity level (block 712). As described above, the user may select a mixed mapping at the chassis level and expand the mixed mapping to map at the blade level, for example. The user may perform LUN masking/mapping at even lower levels of granularity, such as for individual logical volumes, for example.

If the user wishes to map servers and/or storage at a lower granularity level, the user selects storage at a next lower granularity level (block 714). The user then selects servers to map at the current (lower) granularity level (block 716). The GUI then applies the mapping (block 718). The GUI may also show a current granularity level topographical view (block 720), although the entire mapping may be done using a table structure, or the entire mapping may be done using a topographical view. Thereafter, operation returns to block 712 to determine whether the user wishes to map servers and/or storage at a lower granularity level.

If the user does not wish to perform LUN masking/mapping at a lower granularity level in block 712, the storage manager applies the LUN masking/mapping (block 722). Next, the LUN masking/mapping information is sent from the storage manager to the SAN manager (block 724). The SAN manager zones the SAN based on the LUN masking/mapping information (block 726). Thereafter, operation ends.

FIG. 8 is a flowchart illustrating operation of zoning devices in a storage area network based on logical unit number masking/mapping in accordance with an illustrative embodiment. Operation begins, and the zone manager maps each host port to its own zone group (block 802). Then, the zone manager maps each host port to the ports it is supposed to see based on the LUN mapping (block 804). Thereafter, operation ends. This approach may max out at a small port count. Refer to U.S. patent application Ser. No. 11/859,867, entitled "System and Method for Zoning of Devices in a Storage Area Network" for a method to map in larger SANs.

Thus, the illustrative embodiments solve the deficiencies of the prior art by providing a graphical user interface for logical unit number (LUN) mapping and masking and automatically zoning the storage area network based on the LUN mapping/masking. The illustrative embodiments greatly simplify the combined task of LUN mapping/masking and zoning by merging the two steps into one mapping and then automatically zoning based on the LUN mapping/masking.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices Including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for zoning a storage area network with logical unit number masking/mapping, the method comprising:
   pulling host port information from a storage area network manager;
   providing, by a storage manager, a graphical user interface to present the host port information to a user and to perform logical unit number mapping, wherein the graphical user interface is a web based interface;
   receiving user input via the graphical user interface that represents a mapping of one or more servers to one or more logical volumes to form a logical unit number mapping;
   applying the logical unit number mapping in a storage manager;
   pushing the logical unit number mapping from the storage manager to the storage area network manager; and
   automatically zoning, by the storage area network manager, the storage area network based on the logical unit number mapping.

2. The method of claim 1, wherein providing the graphical user interface comprises providing a user interface for mapping servers to storage at a chassis level.

3. The method of claim 1, wherein providing the graphical user interface further comprises providing a mixed mapping graphical indicator.

4. The method of claim 3, further comprising:
   expanding the mixed mapping graphical indicator such that a user maps zero or more servers to zero or more logical volumes at a blade level.

5. The method of claim 1, wherein the graphical user interface comprises a table or a topographical view.

6. The method of claim 1, wherein the graphical user interface comprises a control and wherein applying the logical unit number mapping comprises mapping all servers to all storage responsive to selection of the control.

7. A data processing system for zoning a storage area network with logical unit number masking/mapping, the data processing system comprising:
   a processor; and
   a memory coupled to the processor, the memory comprising instructions which, when executed by the processor, cause the processor to:
   pull host port information from a storage area network manager;
   provide, by a storage manager, a graphical user interface to present the host port information to a user and to perform logical unit number mapping, wherein the graphical user interface is a web based interface;
   receive user input via the graphical user interface that represents a mapping of one or more servers to one or more Logical volumes to form a logical unit number mapping;
   apply the logical unit number mapping in a storage manager;
   push the logical unit number mapping from the storage manager to the storage area a network manager; and
   automatically zone, by the storage area network manager, the storage area network based on the logical unit number mapping.

8. A computer program product comprising a non-transitory computer useable medium having a computer readable program, wherein the computer readable program, when executed on a computing device, causes the computing device to:
   pull host port information from a storage area network manager;
   provide, by a storage manager, a graphical user interface to present the host port information to a user and to perform logical unit number mapping, wherein the graphical user interface is a web based interface;
   receive user input via the graphical user interface that represents a mapping of one or more servers to one or more logical volumes to form a logical unit number mapping;
   apply the logical unit number mapping in a storage manager;
   push the logical unit number mapping from the storage manager to the storage area network manager; and
   automatically zone, by the storage area network manager, the storage area network based on the logical unit number mapping.

9. The data processing system of claim 7, wherein providing the graphical user interface comprises providing a user interface for mapping servers to storage at a chassis level.

10. The data processing system of claim 7, wherein providing the graphical user interface further comprises providing a mixed mapping graphical indicator.

11. The data processing system of claim 10, wherein the instructions further cause the processor to:
   expanding the mixed mapping graphical indicator such that a user maps zero or more servers to zero or more logical volumes at a blade level.

12. The data processing system of claim 7, wherein the graphical user interface comprises a table or a topographical view.

13. The data processing system of claim 7, wherein the graphical user interface comprises a control and wherein applying the logical unit number mapping comprises mapping all servers to all storage responsive to selection of the control.

14. The computer program product of claim 8, wherein providing the graphical user interface comprises providing a user interface for mapping servers to storage at a chassis level.

15. The computer program product of claim 8, wherein providing the graphical user interface further comprises providing a mixed mapping graphical indicator.

16. The computer program product of claim 15, wherein the computer readable program further causes the computing device to expand the mixed mapping graphical indicator such that a user maps zero or more servers to zero or more logical volumes at a blade level.

17. The computer program product of claim 8, wherein the graphical user interface comprises a table or a topographical view.

18. The computer program product of claim 8, wherein the graphical user interface comprises a control and wherein applying the logical unit number mapping comprises mapping all servers to all storage responsive to selection of the control.

* * * * *